(12) United States Patent
Fujiwara et al.

(10) Patent No.: US 8,771,602 B2
(45) Date of Patent: Jul. 8, 2014

(54) RESIN PRODUCTION APPARATUS AND RESIN PRODUCTION METHOD

(75) Inventors: Shuzo Fujiwara, Ibaraki (JP); Yasuhide Suzuki, Ibaraki (JP); Yasuhiko Okuda, Ibaraki (JP); Tetsuya Hirose, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 651 days.

(21) Appl. No.: 12/946,382

(22) Filed: Nov. 15, 2010

(65) Prior Publication Data
US 2011/0152564 A1 Jun. 23, 2011

(30) Foreign Application Priority Data
Dec. 22, 2009 (JP) ................................ 2009-290850

(51) Int. Cl.
B01J 19/00 (2006.01)
B01J 4/00 (2006.01)

(52) U.S. Cl.
USPC ......................................... 422/131; 422/138

(58) Field of Classification Search
None
See application file for complete search history.

(56) References Cited

U.S. PATENT DOCUMENTS

| | | | | |
|---|---|---|---|---|
| 1,589,245 A * | 6/1926 | Lane | .......................... | 239/533.9 |
| 2,301,204 A * | 11/1942 | Fields et al. | ................... | 422/135 |
| 2,367,149 A | 1/1945 | Smith | | |
| 4,008,048 A * | 2/1977 | Hellemans et al. | ........... | 422/134 |
| 4,354,987 A | 10/1982 | Iya | | |
| 4,405,545 A * | 9/1983 | Septier et al. | ................. | 264/144 |
| 5,250,640 A | 10/1993 | Irie et al. | | |
| 5,491,279 A | 2/1996 | Robert et al. | | |
| 6,067,776 A * | 5/2000 | Heuer et al. | ..................... | 53/440 |

FOREIGN PATENT DOCUMENTS

| | | |
|---|---|---|
| JP | A-58-198531 | 11/1983 |
| JP | A-60-262849 | 12/1985 |
| JP | U-1-102137 | 7/1989 |
| JP | A-5-112654 | 5/1993 |
| JP | A-5-247225 | 9/1993 |
| JP | 07223221 A * | 8/1995 |
| JP | A-2001-192604 | 7/2001 |
| JP | A-2003-137929 | 5/2003 |
| JP | 2005194396 A * | 7/2005 |

OTHER PUBLICATIONS

English abstract and machine translation for JP 07-223221 A (Aug. 1995).*
English abstract and machine translation for JP 2005-194396 A (Jul. 2005).*
Aug. 29, 2012 Office Action issued in Chinese Patent Application No. 2010-10589410.6 (with translation).

(Continued)

Primary Examiner — Jennifer A Leung
(74) Attorney, Agent, or Firm — Oliff PLC (57) ABSTRACT

A resin production apparatus of the present invention includes: a reactor vessel having a vessel main body which polymerizes an ingredient to produce a thermoplastic synthetic resin which solidifies at room temperature and storing the synthetic resin in the molten state, an output mechanism disposed at a bottom part of the vessel main body, which outputs the synthetic resin in the molten state, and a temperature adjustment mechanism which adjusts temperatures of the vessel main body and the output mechanism so as to maintain the molten state of the synthetic resin; a cooling mechanism arranged below the reactor vessel, which continuously cools and solidifies the synthetic resin output from the output mechanism; and a crushing mechanism which crushes the synthetic resin fed out from the cooling mechanism.

8 Claims, 4 Drawing Sheets

(56) References Cited

OTHER PUBLICATIONS

Mar. 11, 2011 European Search Report issued in EP Patent Application No. 10014952.5.

Apr. 24, 2012 Office Action issued in Japanese Patent Application No. 2009-290850 (with translation).

* cited by examiner

RESIN PRODUCTION APPARATUS AND RESIN PRODUCTION METHOD

CROSS REFERENCE TO RELATED APPLICATION

The present application claims priority from Japanese Patent Application No. 2009-290850 the disclosure of which is herein incorporated by reference in its entirety.

BACKGROUND OF THE INVENTION

1. Field of the Invention

The present invention relates to a resin production apparatus and a resin production method, for producing a synthetic resin such as an acryl oligomer which is used in tackifiers for adhesive tapes.

2. Description of Related Art

When small pieces of a synthetic resin are produced by polymerizing ingredients, the ingredients are usually molten and kneaded while being polymerized to prepare a desirable synthetic resin. The synthetic resin is then cooled, solidified, and pulverized. For example, Japanese Unexamined Patent Publication No. 192604/2001 (Tokukai 2001-192604) discloses a method employing a screw type heating and cooling apparatus or a heat-type agitation and thermal treatment machine as a reactor vessel. In this method, ingredients are heated, molten, and mixed under reduced pressure. Then, the molten product is mixed and dispersed by using a melting-mixing-dispersing machine such as a bi-axial extruder. The resulting product is cooled by a cooling belt or the like, and is coarsely ground, pulverized, and sorted. Further, in the method disclosed in Tokukaihei 5-112654 and Tokukaihei 5-247225, ingredients are supplied in a reactor vessel having a rotating arm. The rotating arm repetitively applies shearing force to the ingredients. This way, a series of processes from preparation of a synthetic resin to pulverization of the product into small pieces are carried out within the reactor vessel. Further, Tokukai 2003-137929 discloses the following method. Namely, ingredients and a particulate polymerization catalyst are supplied in a reactor vessel and are polymerized. Then, the product is placed in a deactivation cleaning tank, and unreacted ingredients are separated. After that, the product is subjected to processes such as drying and sorting using devices for performing these processes.

In the above mentioned traditional production methods, the reactor vessel is cleaned typically by supplying therein a solvent to dissolve and remove residual synthetic resin in the reactor vessel. However, in production of a thermoplastic synthetic resin which solidifies at room temperature, the synthetic resin remaining after the synthetic resin is taken out from the reactor vessel solidifies and clogs parts of the reactor vessel. This necessitates removal of residual synthetic resin in the reactor vessel every time the reaction is carried out. That is, a solvent needs to be supplied in the reactor vessel to dissolve the synthetic resin, before ingredients are supplied to the reactor vessel. The time required for this cleaning process undermines the productivity. Further, increases in the amount of the solvent used and the number of times the solvent is used cause increases in the cost and burden. Further, using a large amount of organic solvent raises the risk that the organic solvent contaminates an oligomer produced without using a solvent. This leads to quality deterioration such as an increase in the amount of VOC (Volatile Organic Compounds).

The present invention is made in view of the above problems, and it is an object of the present invention to provide a resin production apparatus and a resin production method, which requires a less time and burden for removing solidified synthetic resin remaining in the reactor vessel.

SUMMARY OF THE INVENTION

A resin production apparatus of the present invention includes: a reactor vessel having a vessel main body which polymerizes an ingredient to produce a thermoplastic synthetic resin which solidifies at room temperature and storing the synthetic resin in the molten state, an output mechanism disposed at a bottom part of the vessel main body, which outputs the synthetic resin in the molten state, and a temperature adjustment mechanism which adjusts temperatures of the vessel main body and the output mechanism so as to maintain the molten state of the synthetic resin; and a crushing device having a cooling mechanism arranged below the reactor vessel, which continuously cools and solidifies the synthetic resin output from the output mechanism, and a crushing mechanism which crushes the synthetic resin fed out from the cooling mechanism.

In the above structure, an ingredient is polymerized to prepare a synthetic resin in the molten state in the vessel main body of the reactor vessel. Since the temperature adjustment mechanism adjusts the temperatures of the vessel main body and the output mechanism, the synthetic resin prepared is maintained in the molten state. Therefore, the majority of the synthetic resin including the part thereof adhered to a wall surface or the like of the vessel main body drops down due to the gravity, and output from the output mechanism disposed at the bottom part of the vessel main body. Then, the output synthetic resin in the molten state is cooled and solidified, and then crushed into small pieces, in the crushing device arranged below the reactor vessel. As described, the resin production apparatus is capable of outputting the synthetic resin from the reactor vessel by utilizing the gravity, while maintain the molten state of the synthetic resin. The synthetic resin output is then solidified and crushed thereafter in the resin production apparatus. Thus, the volume of residual substance remaining on the inner-wall surface or the like of the reactor vessel 4 is significantly reduced in the resin production apparatus. This reduces the time and burden required for removing solidified synthetic resin remaining in the reactor vessel.

The resin production apparatus may be adapted so that: the output mechanism has an output port formed on the vessel main body, an output tube extending from the output port to the crushing device, and a Y-valve having a valve element disposed at the output port which moves forward/back the valve element to open/close the output port.

In this structure, the Y-valve enables output of the synthetic resin by moving forward/back the valve element to open/close the output port. This is more advantageous than a case of using any other type of valve such as a ball valve for a synthetic resin output mechanism, in that the amount of residual synthetic resin in the output port is reduced while the output port is highly liquid-tightly closable. This further reduces the time and burden required for removing solidified synthetic resin remaining in the reactor vessel.

The resin production apparatus may be adapted so that: the output mechanism further includes a feeding pump connected to the output tube, which feeds out the synthetic resin to the crushing device.

With the structure, a constant amount of synthetic resin is supplied to the subsequent steps: i.e., to the cooling mechanism and the crushing device. As a result, the synthetic resin is always cooled under the same conditions, and a constant amount of synthetic resin is crushed and output. Therefore, the quality is stabilized. Further, in addition to the gravity-attributed downward flow-drive force applied to the synthetic resin in the vessel main body and the output tube, a downward flow-drive force attributed to a suction force generated by the feeding pump is applied. Therefore, outputting of the synthetic resin from the reactor vessel is completed in a short time. Further, acceleration of the drift velocity of the synthetic resin also contributes to reduction of residual synthetic resin.

The resin production apparatus may be adapted so that: the reactor vessel has an inert gas inflow entrance disposed lower than the top surfaces of the synthetic resin and the ingredient, through which an inert gas enters the vessel main body; and an inflow entrance open/close mechanism which moves forward/back the valve element of an injection valve to open/close the inert gas inflow entrance.

With the above structure, the residual synthetic resin at the inert gas inflow entrance is reduced by having the injection valve mechanism open/close the inert gas inflow entrance through which an inert gas is supplied to the synthetic resin or the ingredient.

Further, the resin production apparatus may further include a separating device which delivers ingredient remaining after the polymerization, to the outside the vessel main body.

The above structure enables separation of ingredient, which remains without being polymerized, from the synthetic resin. This contributes to quality improvement of the synthetic resin formed into small pieces.

The resin production apparatus may be adapted so that: the ingredient is a (meth)acrylic monomer, the polymerization is bulk polymerization, and the synthetic resin is a (meth)acrylic oligomer.

The above structure is suitably used for production of (meth)acryl oligomer.

A resin production method of the present invention, includes the steps of: opening an output port formed at a bottom part of a reactor vessel and supplying an ingredient in the reactor vessel (ingredient supplying step); polymerizing the ingredient to produce a thermoplastic synthetic resin which solidifies at room temperature and storing the resin in the molten state in the reactor vessel (polymerization step); outputting the synthetic resin by opening an output port, while adjusting the temperature to maintain the molten state of the synthetic resin (outlet step); and crushing the synthetic resin after the synthetic resin output and free-fallen from the output port is continuously cooled and solidified (crushing step).

The above structure utilizes gravity to output the synthetic resin from the reactor vessel, while maintaining the molten state of the synthetic resin. The synthetic resin output is then solidified and crushed. Thus, the volume of residue inside the reactor vessel is significantly reduced. As the result, the time and burden required for removing solidified synthetic resin remaining in the reactor vessel is reduced. Further, a highly pure resin flakes are efficiently produced without a use of a solvent.

With the present invention, the time and burden required for removing solidified synthetic resin remaining in the reactor vessel is reduced. The present invention therefore enables improvement of the productivity and cutting down of the cost.

DESCRIPTION OF THE PREFERRED EMBODIMENTS

Figure 1:
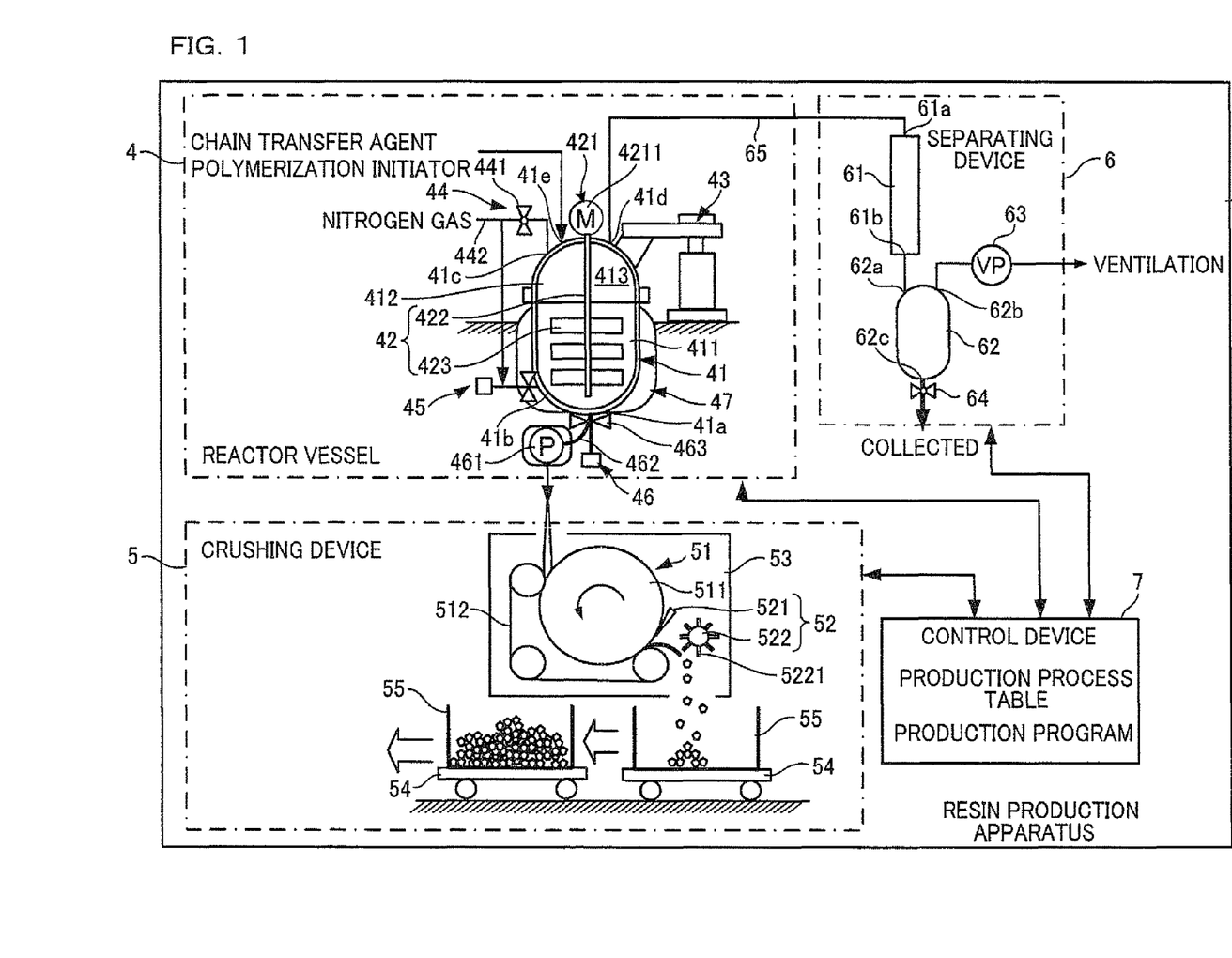
FIG. 1 is an explanatory diagram showing an overall structure of a resin production apparatus.

The following describes with reference to attached drawings a preferable embodiment of the present invention. (Resin Production System) As shown in FIG. 1, a resin production apparatus 1 of the present embodiment includes: a reactor vessel 4, a crushing device 5, a separating device 6, and a control device 7. The reactor vessel 4 is arranged so that an ingredient is polymerized to prepare a thermoplastic synthetic resin which solidifies at room temperature, the prepared synthetic resin is stored in the molten state, and this synthetic resin is then output from an output port 41a disposed at the bottom part towards a crushing device 5 provided below, while the temperature being adjusted to maintain the molten state of the resin.

The wording "molten state" means any state of material where the material is moveable by the gravity. Further, "to maintain the molten state" does not mean to keep a constant viscosity. The expression means that, regardless of changes in the viscosity of the resin during the production, the molten state of the resin is maintained. In short, the expression means to keep the synthetic resin from being solidified. The crushing device 5 crushes the synthetic resin, after the synthetic resin output and free-fallen from the reactor vessel 4 is successively cooled and solidified. The separating device 6 separates the ingredient and while keeping the synthetic resin in the reactor vessel 4. These members 4 to 6 are detailed later.

The resin production apparatus 1 having the above described structure realizes a resin production method, including the steps of: opening an output port 41a formed at a bottom part of a reactor vessel 4 and supplying an ingredient in the reactor vessel 4 (ingredient supplying step); polymerizing the ingredient to prepare thermoplastic synthetic resin which solidifies at room temperature and storing the resin in the molten state (polymerization step); outputting the synthetic resin by opening an output port 41a, while adjusting the temperature to maintain the molten state of the synthetic resin (outlet step); and crushing the synthetic resin after the synthetic resin output and free-fallen from the output port 41a is successively cooled and solidified (crushing step).

The above steps are detailed supposing that an acryl monomer is used as an ingredient. The acryl monomer which is an ingredient for producing a tackifier is supplied in the reactor vessel 4 (ingredient supplying step). Then, the temperature is increased while carrying out nitrogen substitution by supplying nitrogen gas through the bottom part of the reactor vessel 4 and rotating a mixing blade. Note that the target temperature for the nitrogen substitution varies according to the decomposition temperature of the initiator used; however, the target temperature is preferably at or 5° C. to 10° C. lower than one-hour half life temperature of the initiator (first nitrogen substitution step).

A chain transfer agent and an initiator are supplied after approximately one hour from the start of the nitrogen substitution and after the temperature reaches the target temperature (polymerization initiating step). The nitrogen gas is stopped being supplied through the bottom part of the reactor vessel 4, and is supplied through a top part of the reactor vessel 4 (second nitrogen substitution step). The polymerization initiating step may be carried out after the second nitrogen substitution step. The internal temperature of the reactor vessel 4 is increased step by step, while preventing an excessive increase of the temperature. This step by step increase in the temperature is for preventing the temperature from excessively overshooting the target temperature. Since the melting temperature of an oligomer varies depending on the monomer, the target temperature is also variable. However, in polymerization of an oligomer of CHMA (cyclo hexyl methacrylate) for example, a final target temperature (final internal temperature) is preferably about 180° C. (polymerization step).

When the internal temperature of the reactor vessel 4 reaches the final target temperature and the reaction is sufficiently close to the end, the reactor vessel 4 is depressurized while the high temperature is maintained. This vaporizes and separates unreacted monomers and improves the purity of the acryl oligomer. Note that the degree of vacuum in the reactor vessel 4 is preferably as low as possible. However, in consideration of the seal of the reactor vessel 4 and the capacity of the vacuum pump, the realistic value is approximately 1 to 5 kPa (abs). It is also preferable that the period of depressurization be as long as possible. However, the efficiency of separating the unreacted monomers decreases according to the processing time. The realistic processing time therefore is about one hour to two hours (separation step). After that, the acryl oligomer in the molten state is output. The output acryl oligomer is cooled down to room temperature and solidified, and then crushed (outputting/crushing step). The resin production method is further detailed later.

The resin production apparatus 1 and the resin production method utilize gravity to output the synthetic resin from the reactor vessel 4, while maintaining the molten state of the synthetic resin. The synthetic resin output is then solidified and then crushed into small pieces, powder, or particles. Thus, the volume of residue inside the reactor vessel 4 is significantly reduced. As a result, the time and burden required for removing the solidified synthetic resin remaining in the reactor vessel 4 are reduced.

(Ingredient, Synthetic Resin)

The "ingredient" and the "thermoplastic synthetic resin which solidifies at room temperature" are not particularly limited. An example of "thermoplastic synthetic resin which solidifies at room temperature" is a (meth)acrylic oligomer prepared through a bulk polymerization in which polymerization is carried out without using a solvent (i.e. monomer 100%).

(Meth)acrylic oligomers are suitably used as a tackifier which improves the adhesiveness of an adhesive agent made of a polymer of an acrylic monomer. Particularly, in cases of UV adhesive agent where 100% of monomer is polymerized by using a photoinitiator, the polymerization is carried out after shaping the monomer into a sheet-like layer. Therefore, to blend a tackifier, UV polymerization has to be carried out after the tackifier mixed in an acrylic monomer serving as the base of the adhesive agent. For this reason, a tackifier used in a UV adhesive agent needs to be a tackifier that does not hinder the UV polymerization. In this regard, there has been confirmed that acrylic oligomer does not hinder UV polymerization, while a typical rosin, terpene, phenol, or oil based tackifiers or the like does hinder UV polymerization. A suitable ratio of blending acrylic oligomer, for improving the adhesiveness of an UV adhesive agent, is: approximately 5 to 40 parts of acrylic oligomer (molecular mass: 1000 to 10000 level) for 100 parts of acrylic adhesive agent.

An exemplary ingredient of an acrylic oligomer is a (meth)acrylic acid ester. Examples of the (meth)acrylic acid ester include: a (meth)acrylic acid alkyl ester such as (meth)acrylic acid methyl, (meth)acrylic acid ethyl, (meth)acrylic acid propyl, (meth)acrylic acid butyl, (meth)acrylic acid isobutyl, (meth)acrylic acid pentyl, (meth)acrylic acid hexyl, (meth)acrylic acid-2-ethyl hexyl, (meth)acrylic acid octyl, (meth)acrylic acid nonyl, (meth)acrylic acid decyl, and (meth)acrylic acid dodecyl; and an ester of an alicyclic alcohol and (meth)acrylic acid such as cyclo hexyl(meth)acrylate, (meth)acrylic acid isobornyl; and (meth)acrylic acid aryl ester such as (meth)acrylic acid phenyl and (meth)acrylic acid benzyl. These (meth)acrylic acid esters may be used alone or in combination.

Further, in addition to the (meth)acrylic acid ester component, an acrylic oligomer may be copolymerized with a monomer having a polymerizable unsaturated bond and copolymerizable with the (meth)acrylic acid ester. Examples of a monomer having a polymerizable unsaturated bond and copolymerizable with a (meth)acrylic acid ester include: (meth)acrylic acid alkoxyalkyl such as (meth)acrylic acid, (meth)acrylic acid methoxy ethyl, (meth)acrylic acid ethoxyethyl, (meth)acrylic acid propoxy ethyl, (meth)acrylic acid butoxy ethyl, and (meth)acrylic acid ethoxypropyl; salt such as (meth)acrylic acid alkali metallic salt; di(meth)acrylic acid ester of (poly)alkylene glycol such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; a multivalent (meth)acrylic acid ester such as trimethylolpropane tri(meth)acrylic acid ester; (meth)acrylonitrile; vinyl acetate; vinylidene chloride; a halogenated vinyl compound such as (meth)acrylic acid-2-chloroethyl; a polymerizable compound containing an oxazoline group, such as 2-vinyl-2-oxazoline, 2-vinyl-5-methyl-2-oxazoline, and 2-isopropenyl-2-oxazoline; a polymerizable compound containing an aziridine group, such as (meth)acryloyl aziridine, and (meth)acrylic acid-2-aziridinyl ethyl; a vinyl monomer containing an epoxy group, such as allyl glycidyl ether, (meth)acrylic acid glycidyl ether, and (meth)acrylic acid-2-ethyl glycidyl ether; a vinyl monomer containing a hydroxyl group, such as (meth)acrylic acid-2-hydroxy ethyl, (meth)acrylic acid-2-hydroxy propyl, a monoester of (meth)acrylic acid and polypropylene glycol or polyethylene glycol, an adduct of lactones and (meth)acrylic acid-2-hydroxy ethyl; a fluorine containing vinyl monomer such as fluorine-substituted (meth)acrylic acid alkyl ester;

an unsaturated carboxylic acid such as an itaconic acid, crotonic acid, a maleic acid, a fumaric acid, and a (partial) ester compound and acid anhydride of these; a vinyl monomer containing an amide group, such as 2-chlorethyl vinyl ether, a vinyl monomer containing reactive halogen such as monochloro acetic acid vinyl, methacryl amide, N-methylol methacryl amide, N-methoxy ethyl methacryl amide, N-butoxy methyl methacryl amide, and N-acryloyl morpholine; an organosilicon-containing vinyl monomer such as vinyl trimethoxy silane, λ-methacryloxy propyl trimethoxy silane, allyl trimethoxy silane, trimethoxy silyl propyl allyl amine, and 2-methoxy ethoxy trimethoxy silane; and macro monomers obtained by polymerizing a vinyl group, which has at its end a radical polymerizable vinyl group. These monomers may be copolymerized singly or in combination with the above (meth)acrylic acid ester.

To the acrylic oligomer, a functional group reactive with an epoxy group or an isocyanate group may be introduced. Examples of the functional group include: hydroxyl group, a carboxyl group, an amino group, amide group, and a mercapto group. It is preferred that a monomer having such a functional group be used in production of the acrylic oligomer.

Further, during polymerization of acrylic oligomer, a chain transfer agent may be used to adjust the molecular mass. Examples of the chain transfer agent include: a compound having a mercapto group such as octyl mercaptan, dodecyl mercaptan, and t-dodecyl mercaptan. However, it is suitable to use a thioglycolic acid such as thioglycolic acid; thioglycolic acid ethyl; thioglycolic acid propyl; thioglycolic acid butyl; thioglycolic acid t-butyl; thioglycolic acid 2-ethyl hexyl; thioglycolic acid octyl; thioglycolic acid decyl; thioglycolic acid dodecyl; ethylene glycol; thioglycolic acid ester; thioglycolic acid ester of neopentylglycol; and thioglycolic acid ester of pentaerythritol.

The amount of the chain transfer agent used is not particularly limited. However, usually, the amount of chain transfer agent used for 100 weight part of the acrylic monomer is preferably 0.1 to 20 weight part, more preferably 0.2 to 15 weight part, and even more preferably 0.3 to 10 weight part. An acrylic oligomer with a suitable molecular mass is obtained by adjusting the amount of chain transfer agent added as above.

(Reactor Vessel 4)

Figure 2:
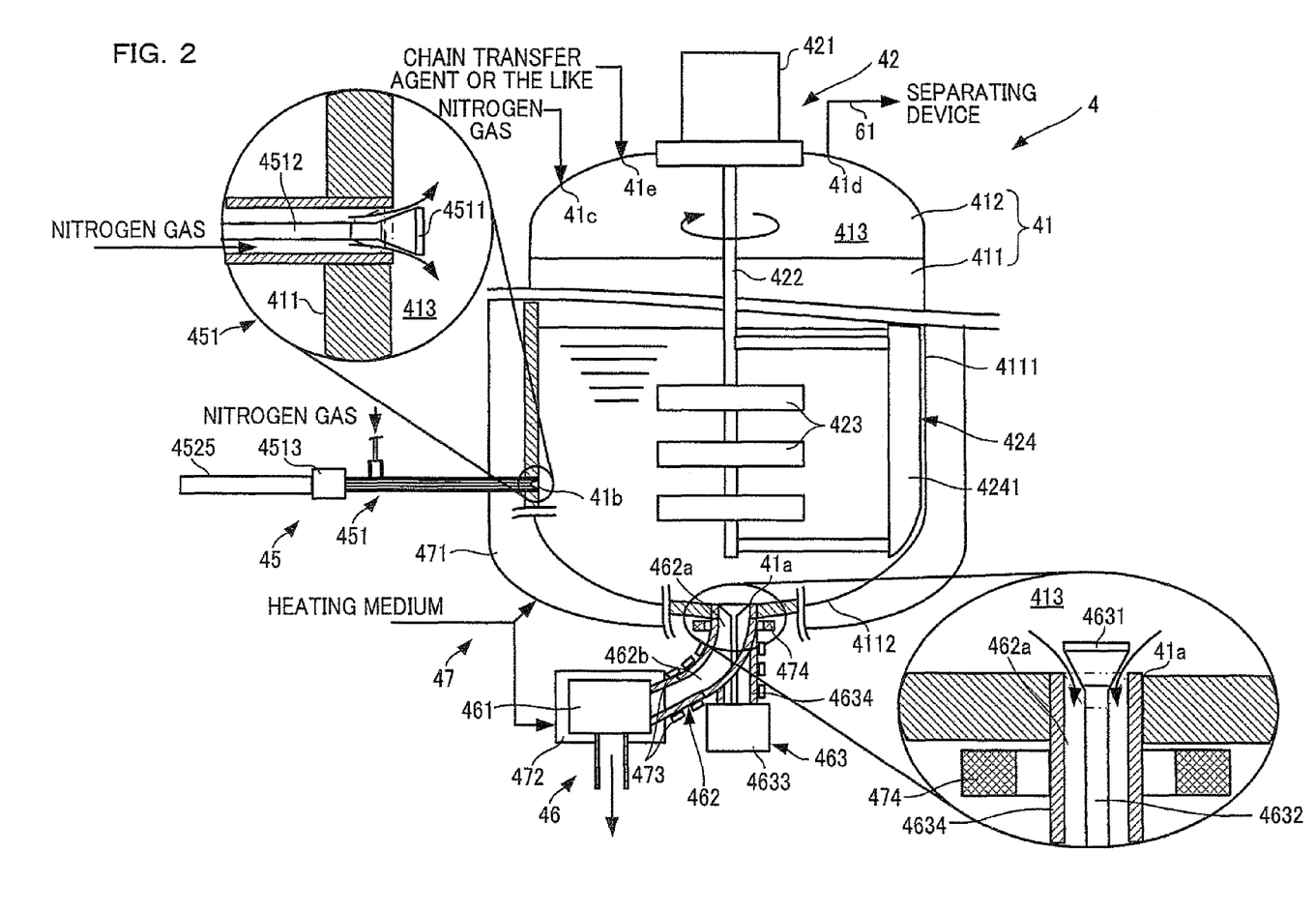
FIG. 2 is an explanatory diagram showing an overall structure of a reactor vessel.

As shown in FIG. 2, the reactor vessel 4 provided in the resin production apparatus 1 includes: a vessel main body 41 which prepares a synthetic resin such as acrylic oligomer and stores the resin in the molten state; an agitation mechanism 42 which agitates an ingredient or the synthetic resin stored in the vessel main body 41; a lid open/close mechanism 43 which enables supplying of an ingredient into the vessel main body 41; an upper gas supply mechanism 44 which supplies nitrogen gas from the top of the ingredient or the synthetic resin stored in the vessel main body 41; a lower gas supply mechanism 45 which supplies nitrogen gas to lower side of the ingredient or the synthetic resin stored in the vessel main body 41; an output mechanism 46 which outputs the synthetic resin; a temperature adjustment mechanism 47 which adjust the temperatures of the vessel main body 41, the ingredient, and the synthetic resin to any given temperature.

(Reactor Vessel 4: Vessel Main Body 41)

The vessel main body 41 has an open top cylindrical container 411; and a detachable lid 412 provided at the top part of the container 411, which closes and seals the opening of the container 411. The container 411 whose top part is open has a body 4111 having a circular horizontal cross section; and a bottom part 4112 connected to a lower rim of the body 4111, which is curved in a convex shape so that the center portion forms the lowest end.

Above the container 411 is arranged the lid 412. The lid 412 is movably supported by the lid open/close mechanism 43. The lid open/close mechanism 43 is a hydraulic cylinder device or the like, and has at least a function of lifting or lowering the lid 412. Lifting operation to lift up the lid 412 opens the top part of the container 411. The top part of the container 411 is closed and sealed as the lid 412 is lowered. This way the vessel main body 41 is able to form an air-tight storage space 413 in which an ingredient is polymerized to prepare a synthetic resin.

The lid 412 has an upper gas supply port 41c, a material supply port 41e, and a gas output port 41d. Note that the lid 412 may have an ingredient supply port through which an ingredient is supplied through a not-shown pipe connected to the port. The upper gas supply port 41c forms a part of the upper gas supply mechanism 44. The upper gas supply mechanism 44 has the upper gas supply port 41c, a valve member 441 which opens/closes the upper gas supply port 41c, and a gas pipe 442 connected to a not-shown nitrogen gas supply system. Since the upper gas supply port 41c is positioned above the level of the synthetic resin and the ingredient, various types of valves such as ball valves are adoptable as the valve member 441. The material supply port 41e is opened when supplying a chain transfer agent, a polymerization initiator, or the like in the storage space 413. The gas output port 41d is connected to the separating device 6 via a not-shown valve member and a gas pipe 65.

(Reactor Vessel 4: Agitation Mechanism 42)

The lid 412 is further provided with the agitation mechanism 42. The agitation mechanism 42 has an agitation drive device 421, an agitation shaft member 422, agitation blade 423, and a scraper 424. The agitation drive device 421 is fixed at the center portion of the top surface of the lid 412. This agitation drive device 421 includes an AC motor (agitation motor 4211) or the like having a decelerator. The rotational speed of the motor is adjustable to any given speed by changing the frequency of the driving power. The agitation drive device 421 is jointed to a rod-like agitation shaft member 422. The agitation shaft member 422 has a vertical shaft center, and air-tightly penetrates the lid 412 so that the agitation shaft member 422 is able to rotate about the center point of the lid 412. This agitation shaft member 422 is disposed so that its lower end is nearby the bottom part of the container 411. The agitation blade 423 and the scraper 424 are provided to this agitation shaft member 422. The agitation blade 423 is disposed on the inner-periphery side of the container 411 so as to agitate an ingredient and a synthetic resin. The scraper 424 has an abutting member 4241 which is positioned nearby the inner-wall surface of the container 411 so as to scrape off the ingredient or the synthetic resin adhered to the inner-wall surface of the container 411.

Typically, for, example, agitation blades adoptable in the agitation mechanism 42 and capable of agitating a highly viscous substance have a helical ribbon shape or an anchor shape. The blades of Twisting Lattice blade type polymerizer (manufactured by: Hitachi, Ltd.) or Super-Mix MR524 (manufactured by: Satake Chemical Equipment MFG, Ltd.) are some of the examples of commercially available blades having such shapes.

(Reactor Vessel 4: Lower Gas Supply Mechanism 45)

The container 411 is further provided with the lower gas supply mechanism 45. The lower gas supply mechanism 45 is provided to at least one of the body 4111 and the bottom part 4112 of the container 411 and is for carrying out nitrogen substitution from the lower part of the storage space 413. The lower gas supply mechanism 45 is disposed lower than the top surfaces of the synthetic resin and the ingredient, and has an inert gas inflow entrance 41b through which nitrogen gas flows inside the container 411 (storage space 413); and an inflow entrance open/close mechanism 451 which opens/closes the inert gas inflow entrance 41b.

Figure 3A:
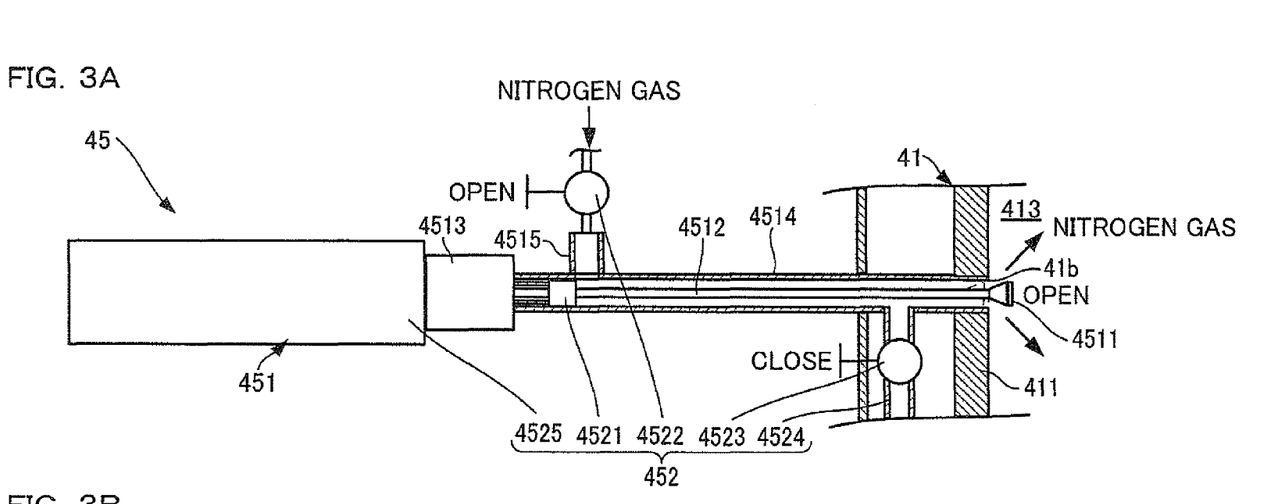
FIG. 3A is an explanatory diagram showing an open state of a lower gas supply mechanism.
Figure 3B:
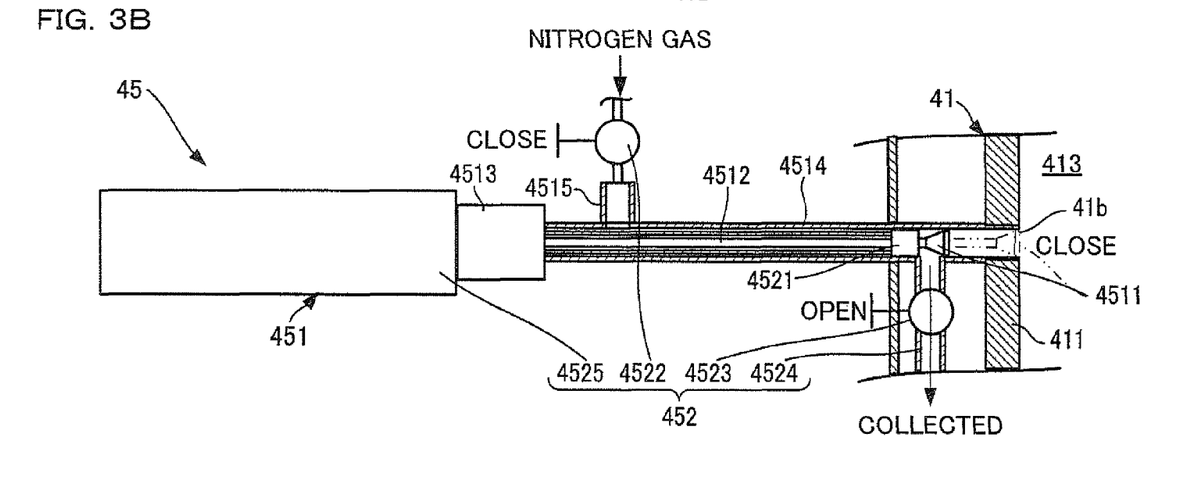
FIG. 3B is an explanatory diagram showing a closed state of a lower gas supply mechanism.

As shown in FIGS. 3A and 3B, the inflow entrance open/close mechanism 451 has a valve element 4511 disposed at the inert gas inflow entrance 41b, and an injection valve mechanism 451 which moves forward/back the valve element 4511 to open/close the inert gas inflow entrance 41b. The injection valve mechanism 451 includes: the valve element 4511 disposed at the inert gas inflow entrance 41b; a rod-like reciprocable member 4512 which is horizontally disposed and has its leading end connected to the valve element 4511 and its trailing end of the reciprocable member 4512 positioned outside the container 411; a valve element drive device 4513 connected to the trailing end of the reciprocable member 4512, which moves forward/back the reciprocable member 4512; a cylindrical member 4514 having the reciprocable member 4512 penetrating therethrough, whose one end portion is liquid-tightly (air-tightly) connected to the inert gas inflow entrance 41b, and whose another end portion is liquid-tightly connected to the valve element drive device 4513; and a gas pipe 4515 for supplying nitrogen gas inside the cylindrical member 4514. Note that both liquid-tight connection and air-tight connection are connections that prevent leakage of liquid and gas.

As described, the lower gas supply mechanism 45 is able to supply nitrogen gas in the storage space 413, by moving forward/back the valve element 4511 of the injection valve mechanism 451 to open/close the end surface of the inert gas inflow entrance 41b. This is more advantageous than a case of using other type of valve such as a ball valve for a nitrogen gas supply mechanism, in that the amount of residual synthetic resin in the inert gas inflow entrance 41b is reduced while the inert gas inflow entrance 41b is highly liquid-tightly closable.

The lower gas supply mechanism 45 is further provided with a valve cleaning mechanism 452 which ejects to the outside the ingredient or the synthetic resin accumulated in the cylindrical member 4514. The valve cleaning mechanism 452 includes: a valve member 4522 which opens/closes the gas pipe 4515; an extruder 4521 disposed in the cylindrical member 4514 and capable of moving forward/back; a cleaning pipe 4524 which is connected to the cylindrical member 4514 and is in communication with a not-shown collection tank or the like; a valve member 4523 which opens/closes the cleaning pipe 4524; and an extruder drive device 4525 which moves forward/back the extruder 4521. The extruder 4521 has a dual pipe structure, and the outer circumference of its leading end portion slidably contacts the inner circumference of the cylindrical member 4514. On the inner circumference side of the leading end of the cylindrical member 4514, the reciprocable member 4512 is slidably inserted.

As shown in FIG. 3B, the valve cleaning mechanism 452 opens the valve member 4523 of the cleaning pipe 4524, while closing the valve member 4522 of the gas pipe 4515. Then, the extruder 4521 positioned on the valve element drive device 4513 side is moved towards the cleaning pipe 4524, thus delivering to the outside the ingredient or the synthetic resin accumulated inside the cylindrical member 4514. Note that the valve cleaning mechanism 452 may be adapted so that the valve element 4511 is able to move back in the cylindrical member 4514; i.e., move towards the valve element drive device. In this case, the ingredient or the synthetic resin inside the cylindrical member 4514 is delivered to the outside via the cleaning pipe 4524, by moving back the valve element 4511.

Figure 4:
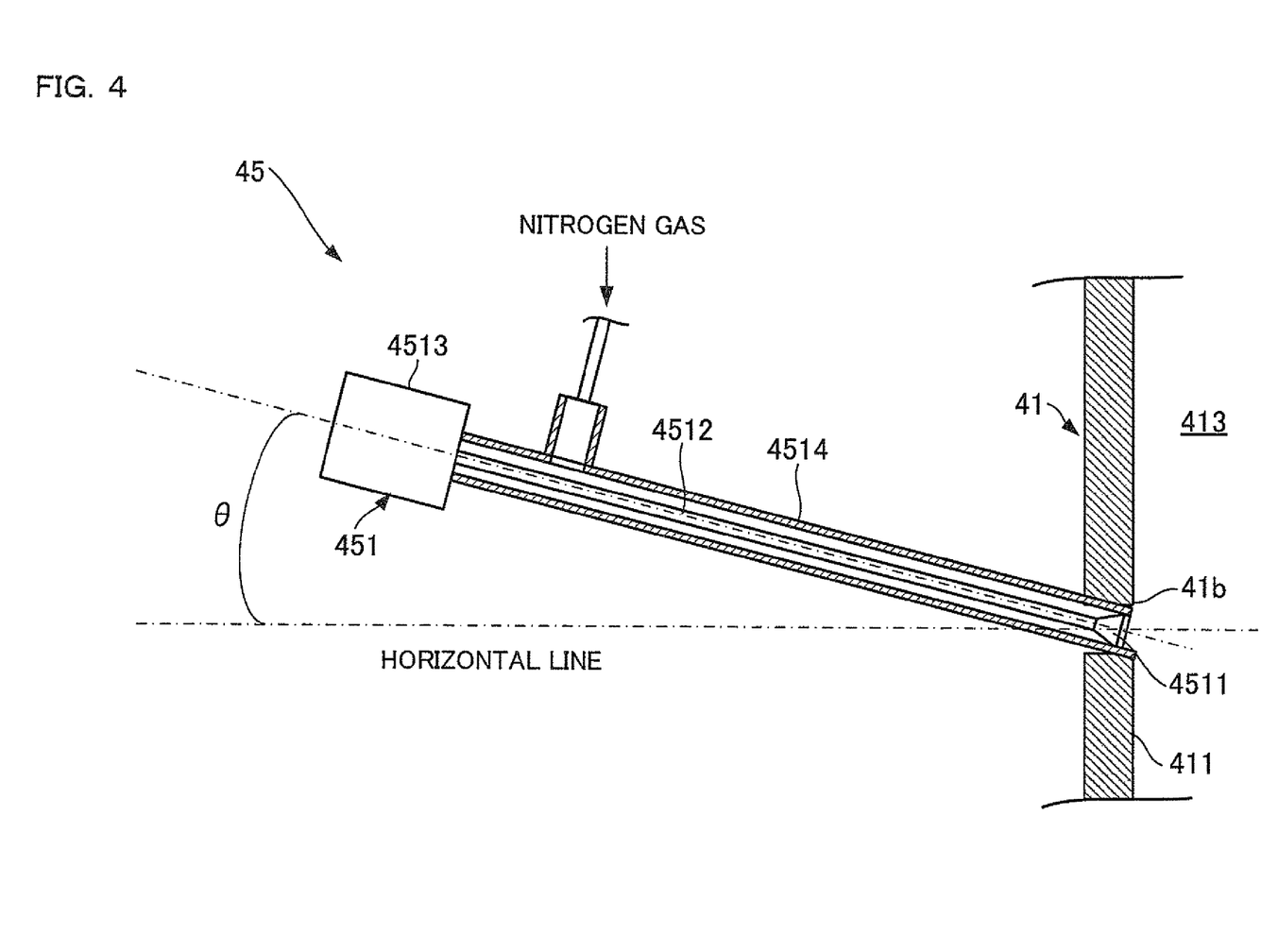
FIG. 4 is a schematic cross sectional view of the lower gas supply mechanism.

As shown in FIG. 4, the cylindrical member 4514 of the lower gas supply mechanism 45 may be tilted upward at a predetermined tilt angle θ from its leading end connecting to the inert gas inflow entrance 41b to its trailing end. The tilt angle θ is not particularly limited. However, the tilt angle θ is preferably close to 90 degree, for the sake of facilitating the movement of the ingredient or the synthetic resin by its own weight towards the storage space 413. This way, the gravity prevents the ingredient or the synthetic resin from entering the cylindrical member 4514, and the ingredient or the synthetic resin having entered the cylindrical member 4514 is brought back into the storage space 413 by its own weight. Further, the above described valve cleaning mechanism 452 may be provided to this tilted lower gas supply mechanism 45. Doing so makes cleaning easy, because the gravity moves the ingredient or the synthetic resin towards the cleaning pipe 4524.

(Reactor Vessel 4: Output Mechanism 46)

As shown in FIG. 2, the vessel main body 41 is provided at its bottom part with an output mechanism 46 which enables outputting of the synthetic resin in the molten state. The output mechanism 46 includes: an output port 41a formed on the vessel main body 41, an output tube 462 extending from the output port 41a to the crushing device 5; a Y-valve 463 which opens/closes the output port 41a; and a feeding pump 461 which forcedly feeds the synthetic resin towards output end.

The Y-valve 463 has a valve element 4631 disposed at the output port 41a; a rod-like reciprocable member 4632 which is vertically disposed and has its leading end connected to the valve element 4631 and its positioned outside the container 411; a valve element drive device 4633 which is connected to the trailing end of the reciprocable member 4632 and moves forward/back (lifts up/lowers) the reciprocable member 4632; a cylindrical member 4634 having the reciprocable member 4632 penetrating therethrough, whose lower end portion is liquid-tightly connected to the valve element drive device 4633. In this structure, the Y-valve 463 enables output of the synthetic resin by moving forward/back the valve element 4631 to open/close the output port 41a. This is more advantageous than a case of using any other type of valve such as a ball valve for a synthetic resin output mechanism, in that the amount of residual synthetic resin in the output port 41a is reduced while the output port 41a is highly liquid-tightly closable.

The upper end portion of the cylindrical member 4634 of the Y-valve 463 is connected to a midway portion of the output tube 462. The output tube 462 has a vertical portion 462a on its upper side and an inflection part 462b on its lower side. The vertical portion 462a has a vertical piping axis, and has its upper end (hereinafter, vertical upper end) connected to the output port 41a. The inflection part 462b on the other hand is formed as follows. Namely, the upper end of the inflection part 462 (hereinafter, inflection upper end) is connected to the lower end of the vertical portion 462a (hereinafter, vertical lower end). Meanwhile, the inflection part 462b satisfies the following inflection conditions. Namely, the piping axis of at least a part of the inflection part 462b from the vertical portion 462a to a certain position is in a direction crossing the vertical direction. The inflection part 462b extends in such a manner that a portion thereof closer to the inflection upper end is higher than a portion thereof closer to the lower end of the inflection part 462 (hereinafter, inflection lower end). Specifically, the inflection part 462b is curved in a concave shape so that the inflected upper end is higher than the inflected lower end. The curvature is such that the curvature radius increases from the inflection upper end towards the inflected lower end. Note that the inflection part 462b may have any given shape provided that the above inflection conditions are satisfied. For example, the inflection part 462b may be a straight part having the inflected upper end higher than the inflected lower end.

Each of the vertical upper end and the inflected upper end is an end on the upper side relative to the direction in which the synthetic resin flows when the output port 41a is opened. Further, each of the vertical lower end and the inflected lower end is an end on the lower side relative to the direction in which the synthetic resin flows when the output port 41a is opened.

The output tube 462 is connected to the cylindrical member 4634 of the Y-valve 463. Between the inside of the output tube 462 and inside of the cylindrical member 4634 is provided a partition wall. This partition wall liquid-tightly and slidably contacts the outer circumference of the reciprocable member 4632. This way, the synthetic resin flowing the output tube 462 is kept from flowing in the cylindrical member 4634. Thus, with the output mechanism 46, the synthetic resin in the molten state output from the output port 41a flows in the vertical direction inside the vertical portion 462a of the output tube 462. Then, the flow direction of the synthetic resin is forcedly changed by the inflection part 462b. This changes the pressure distribution of the flowing synthetic resin, and the flow of synthetic resin therefore is less likely retained.

The lower end of the output tube 462 is connected to the feeding pump 461. The feeding pump 461 is structured to feed out the synthetic resin to the crushing device 5. Thus, the output mechanism 46 is capable of supplying a constant amount of synthetic resin to the subsequent steps: i.e., to the cooling mechanism 51 and the crushing device 5. The synthetic resin is therefore always cooled under the same conditions, and a constant amount of synthetic resin is crushed and output. This stabilizes the quality.

Further, in addition to the gravity-attributed downward flow-drive force applied to the synthetic resin in the storage space 413 of the vessel main body 41 and the output tube 462, the output mechanism 46 applies a downward flow-drive force attributed to a suction force generated by the feeding pump 461. Therefore, outputting of the synthetic resin from the storage space 413 is completed in a short time. Even when the amount of remaining synthetic resin in the storage space 413 is reduced and hence the drift velocity attributed to the weight of the synthetic resin itself is also reduced, the output mechanism 46 increases the drift velocity of the synthetic resin by the feeding pump 461. This makes it possible to reduce the amount of the residual synthetic resin.

(Reactor Vessel 4: Temperature Adjustment Mechanism 47)

The reactor vessel 4 having the above described structure is further provided with the temperature adjustment mechanism 47. The temperature adjustment mechanism 47 is structured to carry out temperature adjustment for the vessel main body 41 and the output mechanism 46 so as to maintain the molten state of the synthetic resin. Specifically, the temperature adjustment mechanism 47 includes a container jacket 471 covering the outer wall surface of the container 411 of the vessel main body 41; a pump jacket 472 covering the feeding pump 461; a band heater 473 wound around the outer wall surface of the output tube 462; and an induction heating device 474 disposed at the upper end portion of the output tube 462.

To the container jacket 471 and the pump jacket 472 is supplied a heating medium such as oil or steam. Adjusting the temperature of this heating medium enables adjustment of the temperatures of the container jacket 471 and the pump jacket 472 to a desirable temperature. The band heater 473 is connected to a not-shown heater power supply. By adjusting the power supplied, the temperature of the output tube 462 is adjusted to a desirable temperature. The induction heating device 474 has an induction heating coil disposed around the output port 41a, and a high-frequency power supply which supplies a high-frequency power to the induction heating coil. This induction heating device 474 carries out electromagnetic induction heating to the bottom part of the container 411 around the output port 41a. With this arrangement, the temperature is adjusted to a desirable temperature by adjusting the supplied power and frequency. By partially heating the part around the output port 41a, the induction heating device 474 enables prevention of residual synthetic resin in the output port 41a.

The temperature adjustment mechanism 47 may be entirely structured by a band heater, or entirely structured by a jacket. Further, the temperature adjustment mechanism 47 may include a combination of at least one of a jacket, a band heater, and an induction heating device, which is provided to each of the heating target portions such as the container 411 and the feeding pump 461.

(Crushing Device 5)

Below the reactor vessel 4 having the above described structure is arranged a crushing device 5 as shown in FIG. 1. The crushing device 5 includes: a cooling mechanism 51 which serially cools and solidifies the synthetic resin output from the output mechanism 46; and a crushing mechanism 52 which crushes the synthetic resin fed out from the cooling mechanism 51.

The cooling mechanism 51 includes: a cooling drum 511 horizontally disposed; a not-shown cooling water supply system which supplies cooling water to the cooling drum 511; a cooling belt 512 brought into surface contact with the surface of the cooling drum 511; and a rotation mechanism which rotates the cooling drum 511 and the cooling belt 512 in sync with each other. Each of the cooling drum 511 and the cooling belt 512 has a surface to contact the synthetic resin, which surface is coated by silicon or Teflon (®) resin so as to prevent adhesion of the synthetic resin such as acryl oligomer.

The position where the cooling drum 511 and the cooling belt 512 start to contact is set at the position to which the synthetic resin falls from the reactor vessel 4. In this cooling mechanism 51, the synthetic resin from the reactor vessel 4 is formed into a thin plate by being sandwiched between the cooling mechanism 51 and the cooling belt 512. Then, the synthetic resin is cooled down to a temperature below room temperature. Thus, a thin plate of solidified synthetic resin is formed.

In a position where the cooling drum 511 and the cooling belt 512 separate from each other, the crushing mechanism 52 is arranged. The crushing mechanism 52 has a spatula 521 and a crushing device 522. The spatula 521 has a leading end portion abutting the surface of the cooling drum 511 so as to separate, from the cooling drum 511, the synthetic resin adhering on the surface of the cooling drum 511. The crushing device 522 has a rotating member 5222 and a plurality of rotating blades 5221 fixed on the outer circumference of the rotating member 5222. The crushing device 522 rotates the rotating member 5222 to rotate the rotating blades 5221 at a high speed. This way, the rotating blades 5221 hit and crush the synthetic resin, and break it into small pieces such as powder or particles.

The cooling mechanism 51 and the crushing mechanism 52 are accommodated in a box-shaped casing 53. The casing has an opening below the crushing mechanism 52, and allows the small pieces of synthetic resin to fall downward while preventing scattering of the pieces. Below the opening of the casing 53 is a transferring cart 54 capable of running. The transferring cart 54 is capable of carrying a receiving box 55 whose top is opened. When a predetermined quantity of synthetic resin is supplied into the receiving box 55, the transferring cart 54 carries the receiving box 55 with the synthetic resin to the subsequent step.

As the crushing device 5, Belt Drum Flaker (manufactured by NIPPON COKE & ENGINEERING. CO., LTD.) is adoptable. Further, the crushing device 5 may include: a shaping roller which is disposed upstream of the cooling belt 512 relative to the rotation direction and which is abutted to the cooling drum 511; and a member having a plurality of slits disposed in parallel to and downstream of the shaping roller. While the synthetic resin is formed into a thin plate, the plurality of slits or grooves aligned in parallel to one another in the width direction of the cooling drum 511 form the thin plate of the synthetic resin into thin plates each having a portion with less strength. This facilitates the crushing mechanism 52 to crush the synthetic resin into small pieces.

(Separating Device 6)

As shown in FIG. 1, the reactor vessel 4 is connected to the separating device 6 which delivers ingredient remaining after the polymerization, to the outside of the vessel main body 41. The separating device has a vacuum pump 63 which depressurizes the storage space 413, a condenser 61 having a cooling function, and a monomer trap tank 62. The condenser 61 is tube-shaped and has an inflow entrance 61a disposed at the upper end portion of the condenser 61 and an outflow port 61b disposed at the lower end portion of the condenser 61. The inflow entrance 61a communicates with the gas output port 41d of the lid 412, and receives unreacted ingredient in a vaporized state flowing in from the storage space 413 of the reactor vessel 4. The outflow port 61b on the other hand communicates with the first inflow entrance 62a of the monomer trap tank 62. The condenser 61 causes re-aggregation of the unreacted ingredient having flowed in, and feeds the aggregated ingredient to the monomer trap tank 62.

The monomer trap tank 62 has, in its upper part, a first inflow entrance 62a connected to the condenser 61, and a second inflow entrance 62b connected to the vacuum pump 63. The monomer trap tank 62 further has, in its bottom part, an outflow port 62c through which an unreacted ingredient is output. The outflow port 62c is connected to the collection valve 64 and is opened/closed by the collection valve 64. For example, the collection valve 64 closes the outflow port 62c when the vacuum pump depressurizes the storage space 413, and opens the outflow port 62c when the unreacted ingredients contained in the monomer trap tank 62 is collected. With the separating device 6, ingredient remaining without being polymerized is separated from the synthetic resin. This contributes to quality improvement of the synthetic resin formed into small pieces.

(Control Device 7)

The resin production apparatus 1 having the above described structure is provided with a control device 7, as shown in FIG. 1. This control device 7 which controls the resin production apparatus 1 enables switching over between automatic operation and manual operation of the resin production apparatus 1. The control device 7 rewritably stores various types of data in the form of production process table or the like, and stores various programs such as a program relating to a production main routine.

The following details the operation of the resin production apparatus 1 having the above structure. (Ingredient Supply Step) First, the ingredient supply step is carried out. More specifically, the lid open/close mechanism 43 is activated to lift the lid 412 and separate the lid 412 from the container 411. After confirming that the vessel main body 41, the output port 41a, the inert gas inflow entrance 41b, the upper gas supply port 41c, the material supply port 41e, and the gas output port 41d are all in the closed state, an ingredient is supplied through the opening at the top surface of the container 411. For example, the ingredient is 50 kg of CHMA (cyclo hexyl methacrylate) monomer. Then, the lid 412 is lowered and closely contacted with the container 411 to create an air-tight storage space 413 in the vessel main body 41. Note that CHMA monomer which is the ingredient monomer may be supplied through a not-shown connection pipe, in which case the operation to lift up or lower the lid 412 can be omitted.

(First Nitrogen Substitution Step)

Next, the first nitrogen substitution is carried out. As shown in FIG. 2, the valve element 4511 of the lower gas supply mechanism 45 moves forward to open the inert gas inflow entrance 41b. At the same time, the agitation mechanism 42 is activated and the agitation blade 423 and the abutting member 4241 rotate about the agitation shaft member 422 at a rotation speed of 60 rpm. Then, nitrogen gas is supplied from the lower part of the container 411 at a feed rate of 30 L/min, and is agitated with the ingredient, with the result that nitrogen substitution is carried out. The ingredient (internal temperature) is heated up to 90° C., and is kept at this temperature for 60 min.

(Second Nitrogen Substitution Step)

Next, the second nitrogen substitution step is carried out. More specifically, the valve element 4511 of the lower gas supply mechanism 45 is moved back to close the inert gas inflow entrance 41b. On the other hand, the upper gas supply port 41c is opened. Thus, while the supplying of the nitrogen gas in the ingredient is stopped, nitrogen gas is supplied from the top of the ingredient at a feed rate of 10 L/min. (Polymerization Initiating Step) Next, the polymerization initiating step is carried out. More specifically, the material supply port 41e is opened, and a chain transfer agent and a polymerization initiator are supplied. For example, the chain transfer agent is 1.75 kg of thioglycolic acid, and the polymerization initiator is 7.5 g of PERHEXYL D (produced by NOF Corporation). Thus, polymerization reaction of the ingredient is started.

(Polymerization Step)

Next, the polymerization step is carried out. The reaction heat is utilized to increase the internal temperature step by step until the final internal temperature reaches 180° C., in approximately 5 hours. (Separation Step) Next, the separation step is carried out. More specifically, the upper gas supply port 41c is closed and supplying of the nitrogen gas is stopped. After that, the vacuum pump 63 shown in FIG. 1 is activated while maintaining the sealed state of the storage space 413, and the pressure inside the storage space 413 is reduced to 2 kPa (abs). This depressurized state is kept for 1.5 hr while maintaining the temperature of the storage space 413 at 180° C. This way, unreacted monomers in the storage space 413 are aggregated in the condenser 61 and are trapped in the monomer trap tank 62. Thus, the synthetic resin (acryl oligomer) is separated from the ingredient.

(Outputting/Crushing Step)

Next, the outputting/crushing step is carried out. More specifically, the vacuum pump 63 is stopped, and the pressure of the storage space 413 is brought back to the normal pressure. Then, the upper gas supply port 41c is opened, and nitrogen gas is supplied from the lid 412 side at a feed rate of 10 L/min. After the crushing device 5 is activated, the output port 41a is opened and the feeding pump 461 is activated. Then, the synthetic resin in the molten state which is acryl oligomer is continuously output towards the crushing device 5 from the output port 41a disposed at the bottom part of the vessel main body 41. Even while the synthetic resin is output, the storage space 413 and the output mechanism 46 are heated by the temperature adjustment mechanism 47 to keep their temperatures at 180° C. This way, the acryl oligomer is maintained in the molten state with a low viscosity, and free-falls from the output mechanism 46.

When the molten acryl oligomer is supplied to the crushing device 5, the cooling drum 511 and the cooling belt 512 sandwich therebetween the acryl oligomer, thereby cooling the acryl oligomer and rolling the same into a thin plate. As a result, the acryl oligomer is rapidly cooled down to a temperature below room temperature and is solidified. The thin plate of the solidified acryl oligomer is separated from the cooling drum 511 by the spatula 521, and is crushed into small pieces by the crushing device 522. Thus, highly pure (purity of 98% or above) flakes (approximately 1 mm in thickness and approximately 1 cm in diameter), i.e., small pieces of acryl oligomer, are received in the receiving box 55.

(Cleaning Step)

Next, a cleaning step is carried out. More specifically, when all the acryl oligomer is output from the storage space 413 of the vessel main body 41, the temperature adjustment mechanism 47 stops heating, thus lowering the temperature of the vessel main body 41. At this time, the lower gas supply mechanism 45 is activated and the inert gas inflow entrance 41b is opened. Then, nitrogen gas is sprayed from the lower gas supply mechanism 45 at a rate of 20 L/min. This ejects molten acryl oligomer out from the lower gas supply mechanism 45, and prevents the lower gas supply mechanism 45 from being clogged by solidified acryl oligomer.

SUMMARY

As described, a resin production apparatus 1 of the present embodiment shown in FIG. 1 includes: a reactor vessel 4 having a vessel main body 41 which polymerizes an ingredient to produce a thermoplastic synthetic resin which solidifies at room temperature and storing the synthetic resin in the molten state, an output mechanism 46 disposed at a bottom part of the vessel main body 41, which outputs the synthetic resin in the molten state, and a temperature adjustment mechanism 47 which adjusts temperatures of the vessel main body 41 and the output mechanism 46 so as to maintain the molten state of the synthetic resin; and a crushing device 5 (crushing device) having a cooling mechanism 51 arranged below the reactor vessel 4, which serially cools and solidifies the synthetic resin output from the output mechanism 46, and a crushing mechanism 52 which crushes the synthetic resin fed out from the cooling mechanism 51.

In the above structure, an ingredient is polymerized to prepare a synthetic resin in the molten state in the vessel main body 41 of the reactor vessel 4. Since the temperature adjustment mechanism 47 adjusts the temperatures of the vessel main body 41 and the output mechanism 46, the synthetic resin prepared is maintained in the molten state. Therefore, the majority of the synthetic resin including the part thereof adhered to a wall surface or the like of the vessel main body 41 drops down due to the gravity, and output from the output mechanism 46 disposed at the bottom part of the vessel main body 41. Then, the output synthetic resin in the molten state is cooled and solidified, and then crushed into small pieces, in the crushing device 5 arranged below the reactor vessel 4. As described, the resin production apparatus is capable of outputting the synthetic resin from the reactor vessel 4 by utilizing the gravity, while maintaining the molten state of the synthetic resin. The synthetic resin output is then solidified and crushed thereafter in the resin production apparatus. Thus, the volume of residual substance remaining on the inner-wall surface or the like of the reactor vessel 4 is significantly reduced in the resin production apparatus. This reduces the time and burden required for removing solidified synthetic resin remaining in the reactor vessel 4.

The resin production apparatus 1 may be adapted so that: the output mechanism 46 has an output port 41a formed on the vessel main body 41, an output tube 462 extending from the output port 41a to the crushing device 5, and a Y-valve 463 having a valve element 4631 disposed at the output port 41a which moves forward/back the valve element 4631 to open/close the output port 41a.

In this structure, the Y-valve 463 enables output of the synthetic resin by moving forward/back the valve element 4631 to open/close the output port 41a. This is more advantageous than a case of using any other type of valve such as a ball valve for a synthetic resin output mechanism, in that the amount of residual synthetic resin in the output port 41a is reduced while the output port 41a is highly liquid-tightly closable. This further reduces the time and burden required for removing solidified synthetic resin remaining in the reactor vessel 4.

The resin production apparatus 1 may be adapted so that: the output mechanism 46 further includes an feeding pump 461 connected to the output tube 462, which feeds out the synthetic resin to the crushing device 5.

With the structure, a constant amount of synthetic resin is supplied to the subsequent steps: i.e., to the cooling mechanism 51 and the crushing device 5. The synthetic resin is therefore always cooled under the same conditions, and a constant amount of synthetic resin is crushed and output. This stabilizes the quality. Further, in addition to the gravity-attributed downward flow-drive force applied to the synthetic resin in the vessel main body 41 and the output tube 462, a downward flow-drive force attributed to a suction force generated by the feeding pump 461 is applied. Therefore, outputting of the synthetic resin from the reactor vessel 4 is completed in a short time. Further, acceleration of the drift velocity of the synthetic resin also contributes to reduction of residual synthetic resin.

The resin production apparatus 1 may be adapted so that: the output tube 462 has a vertical portion 462a having a vertical piping axis, and having a vertical upper end connected to the output port 41a, and an inflection part 462b having an inflected upper end connected to a vertical lower end of the vertical portion 462a, wherein the piping axis of at least a part of the inflection part 462b from the vertical portion 462a to a certain position is in a direction crossing the vertical direction, and wherein the inflection part 462b extends in such a manner that a portion thereof closer to the inflection upper end is higher than a portion thereof closer to an inflection lower end; and the Y-valve 463 has a reciprocable member 4632 connected to the valve element 4631, which passes inside the vertical portion 462a and liquid-tightly and moveably penetrates the inflection part 462b, and a valve element drive device 4633 (forward/backward movement drive unit) disposed below the inflection part 462b, which moves forward/back the reciprocable member 4632.

Thus, opening/closing of the output port 41a by the Y-valve 463 is possible with a simple structure. The synthetic resin in the molten state output from the output port 41a flows in the vertical direction inside the vertical portion 462a. Then, the flow direction of the synthetic resin is forcedly changed by the inflection part 462b. This changes the pressure distribution of the flowing synthetic resin and facilitates occurrence of a turbulent flow. The flow of synthetic resin therefore is less likely retained. As the result, residual synthetic resin in the output tube 462 is reduced.

The resin production apparatus 1 may be adapted so that: the reactor vessel 4 has an inert gas inflow entrance 41b disposed lower than the top surfaces of the synthetic resin and the ingredient, through which an inert gas enters the vessel main body 41; and an injection valve mechanism 451 (inflow entrance open/close mechanism) which moves forward/back the valve element 4511 to open/close the inert gas inflow entrance 41b.

With the above structure, the residual synthetic resin at the inert gas inflow entrance 41b is reduced by having the injection valve mechanism 451 open/close the inert gas inflow entrance 41b through which an inert gas is supplied to the synthetic resin or the ingredient.

The resin production apparatus 1 may further include a separating device 6 exhausts ingredient remaining after the polymerization, to the outside the vessel main body 41.

The above structure enables separation of ingredient, which remains without being polymerized, from the synthetic resin. This contributes to quality improvement of the synthetic resin formed into small pieces.

The resin production apparatus 1 may be adapted so that: the ingredient is a (meth)acrylic monomer, the polymerization is bulk polymerization, and the synthetic resin is a (meth) acrylic oligomer. The above structure is suitably used for production of (meth)acryl oligomers.

The resin production apparatus 1 realizes a resin production method, including the steps of: opening an output port 41a formed at a bottom part of a reactor vessel 4 and supplying an ingredient in the reactor vessel 4 (ingredient supplying step); polymerizing the ingredient to produce a thermoplastic synthetic resin which solidifies at room temperature and storing the resin in the molten state in the reactor vessel 4 (polymerization step); outputting the synthetic resin by opening an output port 41a, while adjusting the temperature to maintain the molten state of the synthetic resin (outlet step); and crushing the synthetic resin after the synthetic resin output and free-fallen from the output port 41a is continuously cooled and solidified (crushing step).

The above structure makes it possible to output the synthetic resin from the reactor vessel 4 by utilizing gravity by maintaining the molten state of the synthetic resin, and the synthetic resin output is then solidified and crushed. Thus, the volume of residue inside the reactor vessel 4 is significantly reduced. As the result, the time and burden required for removing solidified synthetic resin remaining in the reactor vessel 4 is reduced. Further, highly pure resin flakes are efficiently produced without a use of a solvent.

The embodiment of the present invention thus described is solely to serve as an example of the present invention, and is not to limit the present invention. Specific structures may be suitably modified. Further, the work and effects described in the embodiment of the present invention are no more than examples achieved by a preferred mode of the present invention, and the work and effects therefore shall not be limited to those described in the embodiment of the present invention.

What is claimed is:

1. A resin production apparatus, comprising:
a reactor vessel having a vessel main body which polymerizes an ingredient to prepare a thermoplastic synthetic resin which solidifies at room temperature and storing the synthetic resin in the molten state, an output mechanism which is disposed at a bottom part of the vessel main body and outputs the synthetic resin in the molten state, and a temperature adjustment mechanism which adjusts temperatures of the vessel main body and the output mechanism so as to maintain the molten state of the synthetic resin;
a crushing device having a cooling mechanism arranged below the reactor vessel, which continuously cools and solidifies the synthetic resin output from the output mechanism, and a crushing mechanism which crushes the synthetic resin fed out from the cooling mechanism; and
a lower gas supply mechanism comprising a valve cleaning mechanism that ejects to the outside an ingredient or accumulated synthetic resin.

2. The resin production apparatus according to claim 1, wherein:
the output mechanism has
an output port formed on the vessel main body,
an output tube extending from the output port to the crushing device, and
a Y-valve having a valve element disposed at the output port, which moves forward/back the valve element to open/close the output port.

3. The resin production apparatus according to claim 1, wherein:
the output mechanism further includes
a feeding pump connected to an output tube extending from an output port to the crushing device, which feeds out the synthetic resin to the crushing device.

4. The resin production apparatus according to claim 1, wherein:
the lower gas supply mechanism has
an inert gas inflow entrance disposed lower than the top surfaces of the synthetic resin and the ingredient, through which an inert gas enters the vessel main body; and
an inflow entrance open/close mechanism which moves forward/back a valve element to open/close the inert gas inflow entrance.

5. The resin production apparatus according to claim 1, further comprising:
a separating device which exhausts ingredient remaining after the polymerization, to the outside the vessel main body.

6. The resin production apparatus according to claim 1, wherein:
the ingredient is a (meth)acrylic monomer, the polymerization is bulk polymerization, and the synthetic resin is a (meth)acrylic oligomer.

7. The resin production apparatus according to claim 1 further comprising the lower gas supply mechanism that is tilted at a predetermined tilt angle θ, wherein θ is greater than 0°.

8. The resin production apparatus according to claim 1, wherein the valve cleaning mechanism comprises:
a valve member which opens/closes a gas pipe;
an extruder disposed in the lower gas supply mechanism and capable of moving forward/back;
a cleaning pipe which is connected to a cylindrical member of the lower gas supply mechanism and is in communication with a collection tank;
a second valve member which opens/closes the cleaning pipe;
and an extruder drive device which moves forward/back the extruder.

* * * * *